(12) United States Patent
Cho et al.

(10) Patent No.: US 9,213,464 B2
(45) Date of Patent: Dec. 15, 2015

(54) PROVIDING GRAPHIC USER INTERFACE BASED UPON USAGE HISTORY

(75) Inventors: Suyeon Cho, Pyeongtaek-si (KR); Jaekyung Lee, Pyeongtaek-si (KR)

(73) Assignee: LG ELECTRONICS INC., Seoul (KR)

( * ) Notice: Subject to any disclaimer, the term of this patent is extended or adjusted under 35 U.S.C. 154(b) by 1067 days.

(21) Appl. No.: 12/816,161

(22) Filed: Jun. 15, 2010

(65) Prior Publication Data

US 2011/0119627 A1    May 19, 2011

(30) Foreign Application Priority Data

Nov. 17, 2009   (KR) .................. 10-2009-0111048

(51) Int. Cl.
G06F 3/048    (2013.01)
G06F 3/0481   (2013.01)

(52) U.S. Cl.
CPC ................................ G06F 3/04817 (2013.01)

(58) Field of Classification Search
CPC ............. G06F 3/0482; G06F 3/04817; H04N 5/44543; H04N 1/00453
USPC ................................................ 715/811, 838
See application file for complete search history.

(56) References Cited

U.S. PATENT DOCUMENTS

| 7,346,373 | B2 * | 3/2008 | Kim .............................. 455/566 |
| 7,409,645 | B2 * | 8/2008 | Sheldon et al. .............. 715/810 |
| 7,426,700 | B2 * | 9/2008 | Sheldon et al. .............. 715/810 |
| 7,468,481 | B2 * | 12/2008 | Kim ................................. 84/601 |
| 7,843,454 | B1 * | 11/2010 | Biswas ......................... 345/473 |
| 2003/0086012 | A1 * | 5/2003 | Stavely et al. ............ 348/333.05 |
| 2003/0123853 | A1 | 7/2003 | Iwahara et al. |
| 2004/0140995 | A1 | 7/2004 | Goldthwaite et al. |
| 2005/0240875 | A1 * | 10/2005 | Takayama et al. ............. 715/745 |
| 2006/0165380 | A1 * | 7/2006 | Tanaka et al. ................... 386/95 |
| 2007/0011622 | A1 * | 1/2007 | Chae et al. ..................... 715/764 |
| 2007/0061745 | A1 * | 3/2007 | Anthony et al. .............. 715/764 |
| 2007/0065044 | A1 * | 3/2007 | Park et al. ..................... 382/305 |
| 2007/0186186 | A1 * | 8/2007 | Both et al. ..................... 715/821 |
| 2008/0034327 | A1 * | 2/2008 | Cisler et al. ................... 715/854 |
| 2008/0250043 | A1 * | 10/2008 | Sato .............................. 707/100 |
| 2009/0067815 | A1 * | 3/2009 | Tsutsui ........................ 386/117 |
| 2009/0125842 | A1 * | 5/2009 | Nakayama .................... 715/835 |
| 2009/0132922 | A1 * | 5/2009 | Shibuya et al. ............... 715/716 |
| 2009/0222757 | A1 * | 9/2009 | Gupta et al. .................. 715/776 |
| 2009/0313586 | A1 * | 12/2009 | Sharma et al. ................ 715/853 |
| 2010/0177233 | A1 | 7/2010 | Tanaka et al. |
| 2010/0299374 | A1 * | 11/2010 | Hara ............................. 707/822 |

FOREIGN PATENT DOCUMENTS

| CN | 1620695 A | 5/2005 |
| CN | 1826803 A | 8/2006 |

(Continued)

*Primary Examiner* — Boris Pesin
*Assistant Examiner* — Ayesha Huertas Torres
(74) *Attorney, Agent, or Firm* — Birch, Stewart, Kolasch & Birch, LLP

(57) ABSTRACT

A multimedia data processing device for providing a graphic user interface includes a multimedia data processing unit configured to process a plurality of multimedia data corresponding respectively to a plurality of sources; an icon generating unit configured to generate a plurality of icons corresponding respectively to the plurality of sources; and a controller configured to control updating at least one of the plurality of icons to reflect a usage history of the at least one of the plurality of icons.

10 Claims, 13 Drawing Sheets

(56) References Cited

FOREIGN PATENT DOCUMENTS

| CN | 101263479 A | 9/2008 |
|---|---|---|
| JP | 2000-76109 A | 3/2000 |
| JP | 2006-11606 A | 1/2006 |
| JP | 2006-350634 A | 12/2006 |
| JP | 2009-65590 A | 3/2009 |
| KR | 10-2004-0067993 A | 7/2004 |
| KR | 10-0679049 B1 | 2/2007 |
| KR | 10-2008-0042871 A | 5/2008 |
| WO | WO 02/35335 A2 | 5/2002 |

* cited by examiner (a) LEVEL ①

(b) LEVEL ②

(c) LEVEL ③

(d) LEVEL ④

PROVIDING GRAPHIC USER INTERFACE BASED UPON USAGE HISTORY

CROSS-REFERENCE TO RELATED APPLICATIONS

This application claims priority under 35 U.S.C. 119 and 35 U.S.C. 365 to Korean Patent Application No. 10-2009-0111048, filed on Nov. 17, 2009, which is hereby incorporated by reference in its entirety.

BACKGROUND

1. Field of the Invention

Embodiments of the invention relate to a graphic user interface of a multimedia data processing device. More particularly, embodiments of the invention relate to a multimedia data processing device and a graphic user interface providing method, which change an icon configuring a graphic user interface that is provided when searching the file of the multimedia data processing device based upon the usage history of a user and thus can provide both the information of multimedia data that are stored in a folder and a source device and the information of the usage history to the user.

2. Discussion of the Related Art

Typically, when electronic devices such as Personal Computers (PCs) or Televisions (TVs) search files that are stored or external devices that are connected to them, each folder or connected devices are displayed as icons. Users may select the displayed icons to search a corresponding folder or the connected devices. Moreover, files may also be displayed as icons, and by selecting an icon representing a file, users may replay a corresponding file or perform various manipulations.

In a related art graphic user interface for file search, since icons that respectively represent files, folders and/or external devices are always and steadily displayed, any information may not be provided to users.

When searching files, a method is required which may use the files and folders in more various schemes.

SUMMARY OF THE INVENTION

Embodiments of the invention provide a graphic user interface for file search, which varies dynamically.

Embodiments of the invention also provide a graphic user interface, which can display the usage history of a user.

In one embodiment of the invention, a multimedia data processing device for providing a graphic user interface includes a multimedia data processing unit configured to process a plurality of multimedia data corresponding respectively to a plurality of sources; an icon generating unit configured to generate a plurality of icons corresponding respectively to the plurality of sources; and a controller configured to control updating at least one of the plurality of icons to reflect a usage history of the at least one of the plurality of icons.

In another embodiment of the invention, a multimedia data processing device for providing a graphic user interface based upon a usage history of a user includes a controller configured to update at least one icon of a multimedia data in a graphic user interface to reflect a last accessed contents associated with a corresponding source; and a storage unit configured to store information of the graphic user interface.

In yet another embodiment of the invention, a method for providing a graphic user interface includes processing a plurality of multimedia data corresponding respectively to a plurality of sources; generating a plurality of icons corresponding respectively to the plurality of sources; and updating at least one of the plurality of icons to reflect a usage history of the at least one of the plurality of icons.

The details of one or more embodiments are set forth in the accompanying drawings and the description below. Other features will be apparent from the description and drawings, and from the claims.

DETAILED DESCRIPTION OF THE EMBODIMENTS

Reference will now be made in detail to the embodiments of the invention, examples of which are illustrated in the accompanying drawings.

Figure 1:
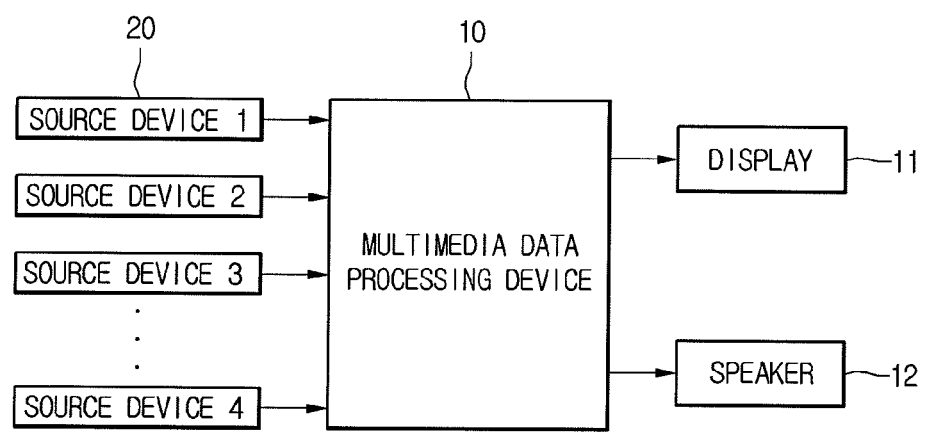
FIG. 1 illustrates a connection relationship between source devices, output devices and a multimedia data processing device according to one embodiment of the invention.

FIG. 1 illustrates a connection relationship between source devices, output devices and a multimedia data processing device according to one embodiment of the invention.

A multimedia data processing device 10 according to one embodiment of the invention replays data that are stored in source devices 20, or transfers the data, which are replayed and transferred by the source devices 20, to an output unit, i.e., a display 11 or a speaker 12. The multimedia data processing device 10, the source devices, and the output units such as the display 11 or the speaker 12, are operatively coupled and configured.

Each of the source devices 20 may be a storage medium for storing multimedia data or a replay device. Specifically, the source devices 20 may include external input devices such as a Universal Serial Bus (USB) memory device, a Digital Video Disk (DVD) player, a Video Cassette Recorder (VCR), a game machine and a Personal Computer (PC), a broadcasting signal receiving device such as a TV and a set-top box, and a network access device such as a Local Area Network (LAN) card. In addition, the source devices 20 may include an arbitrary device that is connected to the multimedia data processing device 10 and provides data to be replayed or replays data to transfer an output signal.

The display 11 receives and outputs video data that has been processed in an outputtable format by the multimedia data processing device 10. The display 11 may be any kind of an image display device such as a Liquid Crystal Display (LCD), a Plasma Display Panel (PDP), an Organic Light Emitting Display (OLED) or a Vacuum Fluorescent Display (VFD), for example.

The speaker 12 receives and outputs sound data that has been processed in an outputtable format by the multimedia data processing device 10. Various types of speakers may be used, as well as any type of audio reproduction devices.

According to one embodiment of the invention, all or a portion of the source devices 20 may be integrated with the multimedia data processing device 10 and be implemented as one device. For example, a USB memory device may be integrated with the multimedia data processing device 10, and moreover, an external input device, a broadcasting receiving device and a network access device may be integrated with the multimedia data processing device 10. Among these, the multimedia data processing device 10 that is integrated with the broadcasting receiving device may operate as a set-top box. If the display 11 and the speaker 12 are added, the multimedia data processing device 10 that is integrated with the broadcasting receiving device may also operate as a TV.

Figure 2:
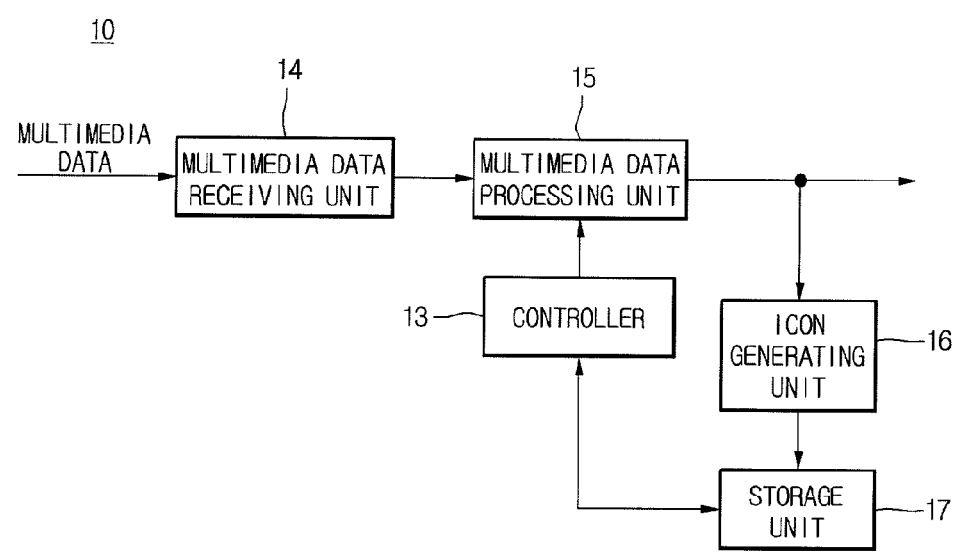
FIG. 2 illustrates a block diagram of the multimedia data processing device according to one embodiment of the invention.

FIG. 2 illustrates a block diagram of the multimedia data processing device 10 according to one embodiment of the invention.

Referring to FIG. 2, the multimedia data processing device 10 according to one embodiment of the invention may include a multimedia data receiving unit 14 that receives multimedia data from the source devices 20, a multimedia data processing unit 15 that processes the multimedia data into an outputtable signal, an icon generating unit 16 that generates an icon representing the multimedia data, a controller 13 that controls the operation of the multimedia data processing unit 15 and the operation of the icon generating unit 16, and generates and provides a graphic user interface based upon the generated icon, and a storage unit 17 that stores the icon and information on the graphic user interface. All components of the multimedia data processing device 10 are operatively coupled and configured.

The multimedia data receiving unit 14 performs an interface function that receives the multimedia data from the source devices 20. Specifically, when the source device 20 is a USB memory, the multimedia data receiving unit 14 may be a USB memory connector. When the source device 20 is an external input device, a set-top box, a TV or a PC, the multimedia data receiving unit 14 may be a Digital Video Interactive (DVI) cable connector, a High Definition Multimedia Interface (HDMI) cable connector, a component cable connector or an RGB-PC cable connector.

The multimedia data processing unit 15 changes multimedia data received by the multimedia data receiving unit 14 into an outputtable signal and outputs the changed signal. Alternatively, when the multimedia data is received as the outputtable signal, it is outputted as-is.

The icon generating unit 16 generates an icon that represents multimedia data that is being outputted from the multimedia data processing unit 15. Specifically, when the multimedia data outputted from the multimedia data processing unit 15 is a moving image, the icon generating unit 16 extracts a thumbnail image. When the output multimedia data is a still image, the icon generating unit 16 scale-downs output data to generate a thumbnail image. When an output signal is a TV broadcasting signal, the icon generating unit 16 extracts a thumbnail image using a thumbnail image extracting method. When an output signal is sound data, the icon generating unit 16 generates an icon image representing the sound data on the basis of the header information of a corresponding sound signal or other information of the sound data. For example, when an output signal is an MP3 music file, the icon generating unit 16 extracts the album title of a corresponding MP3 music file or the name of a musician from overhead information and generates an icon image based upon the extracted album title or name, or the icon generating unit 16 extracts an album jacket image and generates an icon image based upon the extracted image. The icon generating unit 16 may extract an icon image based on a content of the sound data, such as a content of the MP3 music file, including lyrics of the MP3 music file.

The controller 13 controls the operations of other elements, and simultaneously configures a user interface for searching multimedia data based upon the icon that is generated by the icon generating unit 16. Moreover, whenever replaying multimedia data that are provided from the source devices 20, a user updates a user interface with an icon.

The storage unit 17 stores the generated icon and user interface information.

The multimedia data processing device 10 according to one embodiment of the invention may search and replay multimedia data stored in the source devices that are connected to it.

Figure 3:
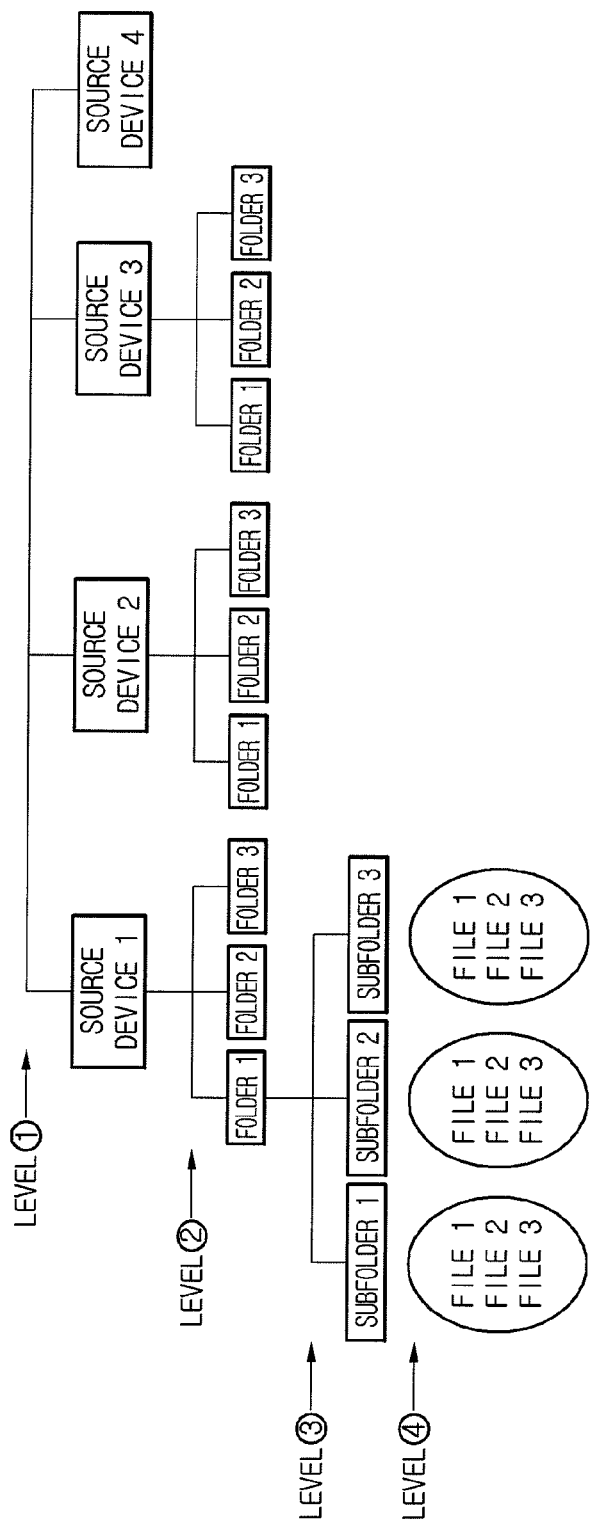
FIG. 3 illustrates a file tree structure which is stored in source devices according to one embodiment of the invention.

FIG. 3 illustrates a file tree structure which is stored in source devices 20 according to one embodiment of the invention.

Referring to FIG. 3, a file system is configured in each of the source devices 20, or lower functions are selectively provided to the source devices 20.

When the file system has been configured, it may be searched in the multimedia data processing device 10.

For example, a source device '1' includes a file system that is configured with folders '1 to 3', a source device '2' includes a file system that is configured with folders '1 to 3', and a source device '3' includes a file system that is configured with folders '1 to 3'. The file systems may be searched in the multimedia data processing device 10. A source device '4' does not include a file system. The source devices '1 to 3' may be source devices that include storage medium such as a USB memory, an external input device and a PC. The source device '4' may be one including no storage medium such as a TV or a set-top box.

It is assumed that the file system of the source device '1' is configured with the folders '1 to 3', the folder '1' is configured with subfolders '1 to 3' and files '1 to 3' are stored in the subfolder '1'. A detailed file system structure may vary according to embodiments of the invention.

According to one embodiment of the invention, the multimedia data processing device 10 may search the file systems of the source devices.

Figure 4:
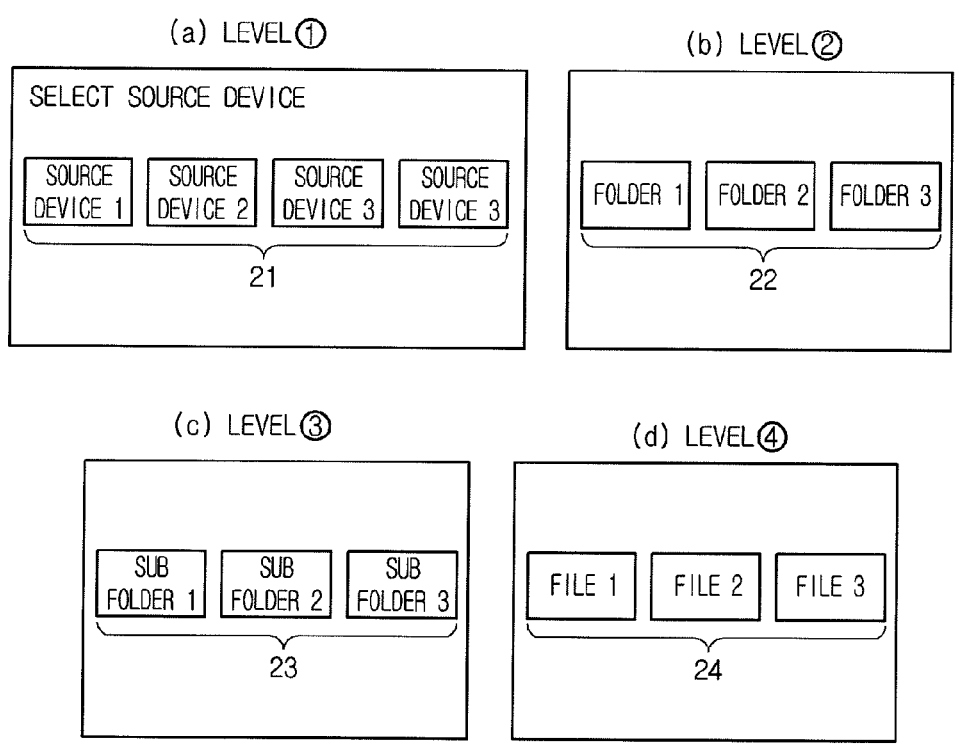
FIG. 4 illustrates examples of a graphic user interface displayed on a display for explaining a file searching method according to one embodiment of the invention.

When a user searches the file systems of the source devices through the multimedia data processing device 10, for example, when the user searches the file systems in a level ①, as illustrated in a portion (a) of FIG. 4, a menu for selecting the source devices is displayed. Icons 21 representing the source devices '1 to 4' are displayed in the menu. By selecting the icons 21 representing the source devices '1 to 4', the user may search the source devices '1 to 4'. At this point, the names or arbitrary images of the source devices '1 to 4' may be displayed in the icons 21 representing the source devices '1 to 4' at an initial stage.

When the user selects the source device '1' and performs search in a level ②, as illustrated in a portion (b) of FIG. 4, the name or arbitrary image of each folder may also be displayed in icons 22 representing folders '1 to 3' at an initial stage. When the user selects the folder '1' and performs search in a level ③, as illustrated in a portion (c) of FIG. 4, icons 23 representing subfolders '1 to 3' are displayed. When the user selects the icon 23 representing the subfolder '1', as illustrated in a portion (d) of FIG. 4, icons 24 representing the files '1 to 3 of the subfolder '1' are displayed. Likewise, the name or arbitrary image of each file may be displayed in icons 24 representing the files '1 to 3'.

Details of the source devices and files will be described below with reference to FIG. 5 as an example.

Figure 5:
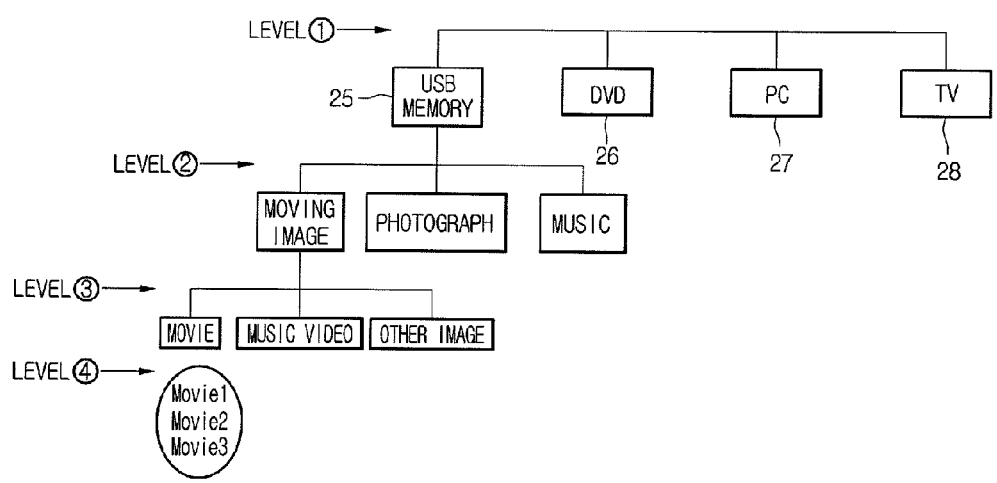
FIGS. 5 to 8 illustrate examples of a file tree and graphic user interfaces displayed on a display for explaining a method of changing an icon of graphic user interfaces based upon a usage history of a user.
Figure 6:
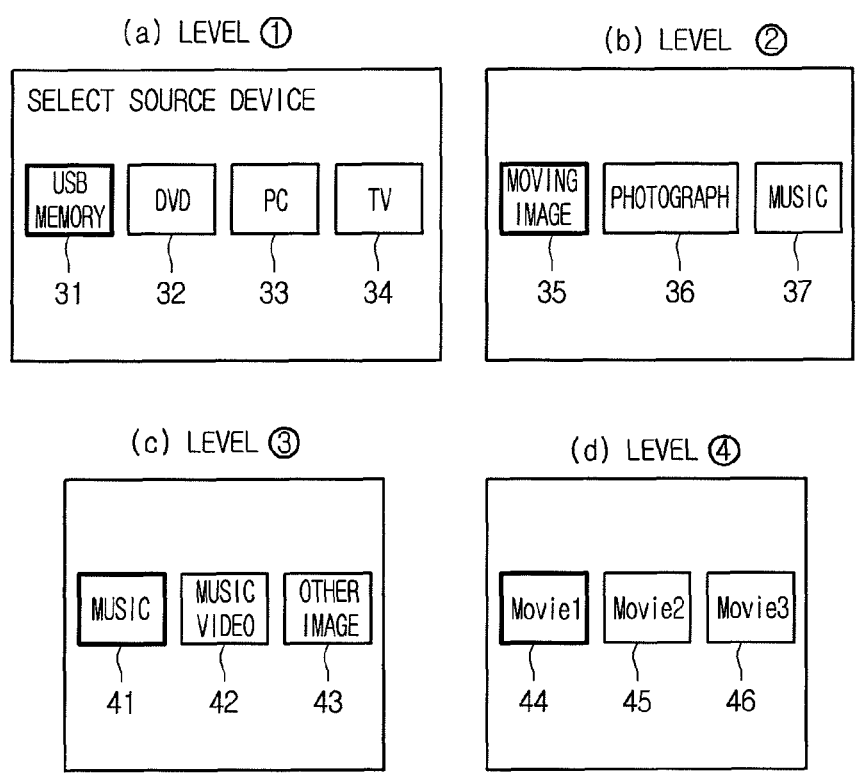

FIG. 5 illustrates an example of a file tree and FIG. 6 illustrates diagrams of graphic user interfaces in which detailed examples are applied to the file structure of FIG. 3 and the graphic user interfaces of FIG. 4.

Referring to FIG. 5, respective source devices are a USB memory 25, a DVD player 26, a PC 27, and a TV signal receiving device 28, such as a TV. These are simply examples, and any type of source device may be used.

When a user searches files through the multimedia data processing device 10, as illustrated in a portion (a) of FIG. 6, icons 31 to 34 representing respective source devices are displayed. A portion (a) of FIG. 6 illustrates a screen that has been searched in the level ① of FIG. 5.

When the user selects a USB memory icon from among the icons 31 to 34, as illustrated in a portion (a) of FIG. 6, folders belonging to the USB memory, i.e., icons 35 to 37 that respectively represent a moving image folder, a photograph folder and a music folder are displayed. A portion (b) of FIG. 6 illustrates a screen that has been searched in the level ② of FIG. 5 for the USB memory. A portion (c) of FIG. 6 illustrates a screen that has been searched in the level ③ of FIG. 5 for the USB memory.

When the user selects an icon 41 in a portion (c) of FIG. 6, as illustrated in a portion (d) of FIG. 6, icons 44 to 46 that respectively represent files (for example, Movie1, Movie2 and Movie3) belonging to a movie folder are displayed. A portion (d) of FIG. 6 illustrates a screen that has been searched in the level ④ of FIG. 5.

In a portion (d) of FIG. 6, when the user selects the icon 44, the file Movie1 is outputted by the multimedia data processing device 10. The file Movie1 stored in the USB memory 25 is inputted to the multimedia data processing device 10, and the Movie1 being a moving image is processed by the multimedia data processing device 10. Since the USB memory 25 has no replay function, the Movie1 is replayed by the multimedia data processing device 10 and is outputted to the display 11 and/or speaker 12 of FIG. 1. Each of source devices autonomously having a replay function, for example, a DVD player, a PC, a TV and a set-top box, transfers an outputtable signal to the multimedia data processing device 10, and the multimedia data processing device 10 transfers the signal to the display 11 and/or the speaker 12.

Referring again to FIG. 2, when multimedia data is processed by the multimedia data processing unit 15 while the Movie1 is being replayed, the icon generating unit 16 extracts a thumbnail image for the Movie1 from the output of the multimedia data processing unit 15. A plurality of thumbnail images may be extracted, and the thumbnail image may be extracted at an arbitrary time through an arbitrary scheme while being replayed. When the Movie1 is a moving image that has been coded in an MPEG coding scheme, the icon generating unit 16 may extract only a I picture and use a portion of the I picture as a thumbnail image.

When replayed multimedia data is a still image, a thumbnail image may be generated through scale down.

When replayed multimedia data is sound data, the icon generating unit 16 may generate an image composed of a singer and a title on the basis of the overhead information of the sound data, or may extract the image of an album jacket as a thumbnail image.

When replayed multimedia data is a TV broadcasting signal, the icon generating unit 16 may extract the thumbnail image of the TV broadcasting signal. As a method of extracting the thumbnail image of the TV broadcasting signal, there may be a plurality of methods, and among these methods, any method may be used.

The thumbnail image, which has been extracted in this way, is used as an icon that represents file representing multimedia data or a source device and a folder including the multimedia data.

The controller 13 of the multimedia data processing device 10 may again configure a user interface for file search with the generated icon. Specifically, the user interface uses the icon, which has been generated on the basis of the replayed multimedia data, as an icon representing each source device, folder or file.

Figure 7:
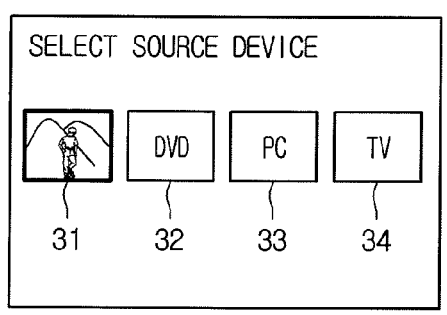
Figure 7:
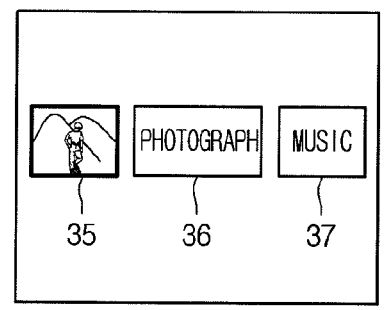
Figure 7:
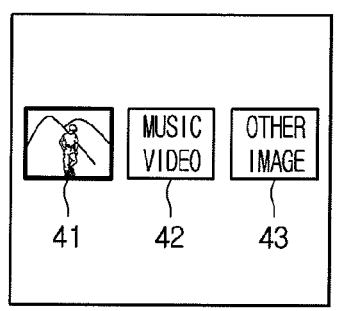
Figure 7:
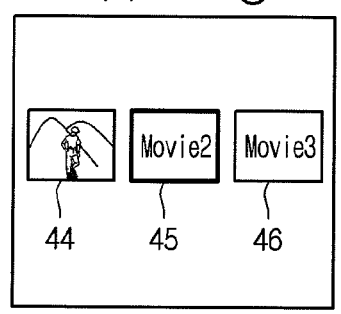

After the Movie1 is replayed, as illustrated in FIG. 7, an icon representing each source device, folder and file is replaced by the thumbnail of the Movie1 when searching the files of the source devices in levels ① to ④.

Referring to FIG. 7, in a portion (d) of FIG. 7, the thumbnail image of the Movie1 is displayed in the icon 44 of a file representing a moving image, which has been replayed the last time, i.e., the Movie1. In portions (a), (b) and (c) of FIG. 7, the thumbnail image of the Movie1 is displayed in the icons 31, 35 and 41 representing source devices and a folder including the Movie1. Multimedia data is processed and information on lastly-processed multimedia data is reflected in a user interface for search, and thus, when the user uses the multimedia data processing device 10 next time, the user can intuitively obtain the information of multimedia data that has been replayed before and information on a corresponding source device and folder.

In a portion (d) of FIG. 7, when it is assumed that the user replays another moving image file, for example, the Movie2 this time, the multimedia data processing device 10 processes the Movie2 stored in the USB memory 25, likewise. At this point, the icon generating unit 16 extracts a thumbnail, and an icon is generated based upon the extracted thumbnail. The controller 13 again updates the user interface for file search with the generated icon. Referring to a portion (d) of FIG. 8, the icon representing the Movie2 is replaced by a thumbnail image. Referring to portions (a), (b) and (c) of FIG. 8, the thumbnail image of the Movie2 is displayed in the icons 31, 35 and 41 representing source devices and a folder including to the Movie2. Through this configuration, the user can very easily obtain information on multimedia data that has most recently been replayed in the multimedia data processing device 10.

Figure 8:
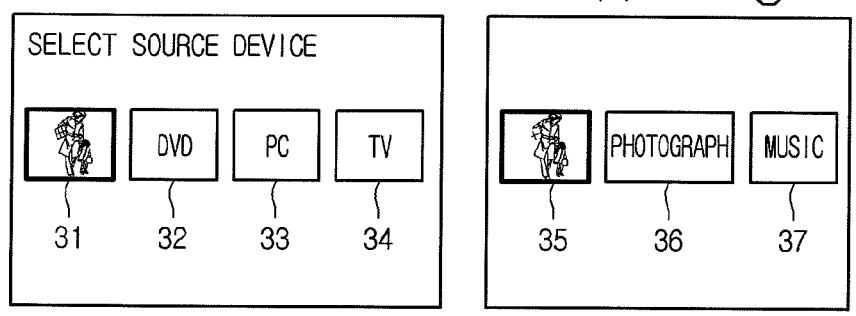

Additionally, at each level ① to ④, as shown in (a) to (d) of FIG. 8, placement or position of each source device, folder and file within the menu may itself indicate whether a source device, a folder and a file has been last accessed to replay multimedia data. For example, in (a) of FIG. 8, the USB memory 31, which contains the multimedia data that was most recently been replayed is disposed at a left most portion of the menu. If the TV 34 has been one that was last accessed to replay TV data, then the TV 34 would be positioned at the left most portion of the menu and would show a thumbnail of the most recently replayed multimedia data. In embodiments of the invention, the placement or position within the menu of the source device, folder and file that has been last accessed to replay multimedia data need not be limited to the least most portion of the menu.

According to one embodiment of the invention, in this way, whenever multimedia data is replayed, an icon configuring a user interface is updated.

As described above, when different multimedia data media are replayed, an icon configuring a user interface is updated, but even when same multimedia data is replayed, an icon may be updated.

For example, when the total running times of the Movie1 are 10 minutes, it is assumed that the Movie1 is replayed only for 1 minute when being replayed for the first time and it is replayed for 5 minutes when being replayed next time. On the assumption of this, when data is replayed for the first time, an icon is configured with a thumbnail image extracted from among data that has been replayed for 1 minute, and when data is replayed next time, an icon is configured with a thumbnail image extracted from among data that has been replayed for 5 minutes. Accordingly, an icon can be updated. Additionally, in an embodiment of the invention, only data that is replayed for equal to or more than a predetermined time, such as 1 minute may be subject to having the icon updated.

Moreover, by using a thumbnail image, which has been extracted immediately before the user stops replay from among the extracted thumbnail images, as an icon, the multimedia data processing device 10 can provide information on to which portion multimedia data has been replayed, to the user interface.

According to one embodiment of the invention, when an updated content is in the user interface for search, i.e., when an icon has been updated, the updated result may be displayed in the user interface.

Figure 9:
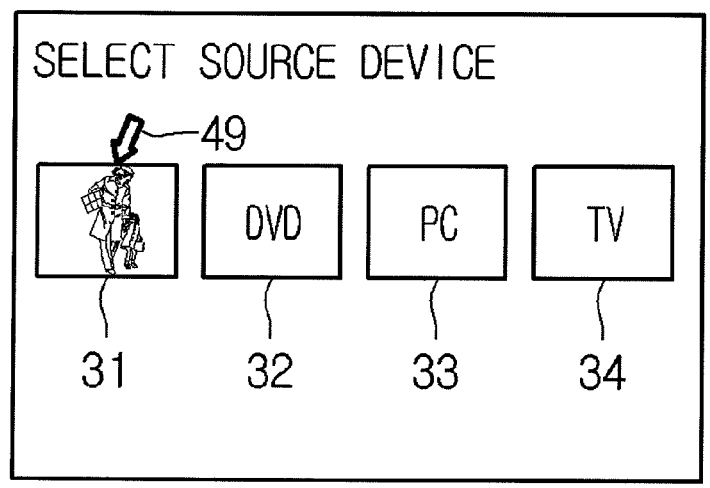
FIGS. 9 to 13 illustrate examples of graphic user interfaces emphasizing and displaying a changed icon according to embodiments of the invention.

For example, as illustrated in FIG. 9, when the icon 31 representing the source device has been changed, a predetermined indicator 49 may be displayed next to the changed icon. Likewise, indicators such as the indicator 49 may also be displayed in the icons 35 and 41 representing folders in portions (b) and (c) of FIG. 8 and the icon 45 representing a file in a portion (d) of FIG. 8, respectively. By displaying the icon 31 that has been updated in this way, information on a folder of which source device multimedia data that has most recently been replayed is stored may be displayed to the user. The shape, kind and display scheme of the indicator may be variously modified.

An updated icon may also be displayed in another scheme. FIGS. 10 to 13 illustrate examples of graphic user interfaces for displaying a changed icon when an icon included in a user interface has been updated, according to embodiments of the invention.

Figure 10:
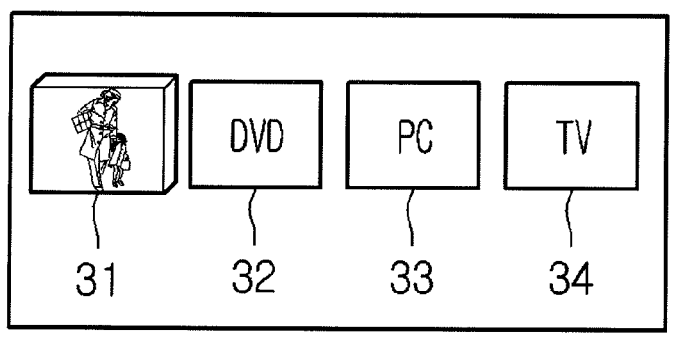

Referring to FIG. 10, the icon 31 that has been updated in a Three-Dimensional (3D) image scheme may be displayed to more protrude than other icons. The 3D image may be composed with a 3D formatter. Thus, the icon 31 is displayed in a raised form.

Figure 11:
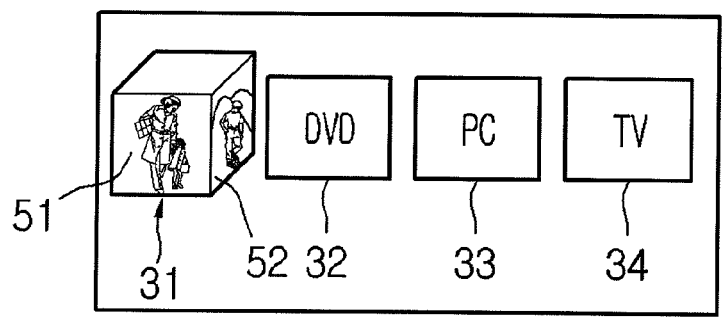

Referring to FIG. 11, the icon 31 is configured in a three-dimensional figure. The thumbnail image of multimedia data that has most recently been replayed is disposed in the front 51, and the thumbnail image of multimedia data that has been replayed before that is disposed in a surface 52 different from the front 51. In this way, a 3D image may be composed. In one embodiment of the invention, the icon 31 may be a cube having 6 surfaces with 6 respective images displayed, for example. The most recent of the images may be indicated by highlighting, color, shape, a sub-icon, or other ways, for example. Accordingly, different surfaces 51, 52 may be shown simultaneously or successively.

Figure 12:
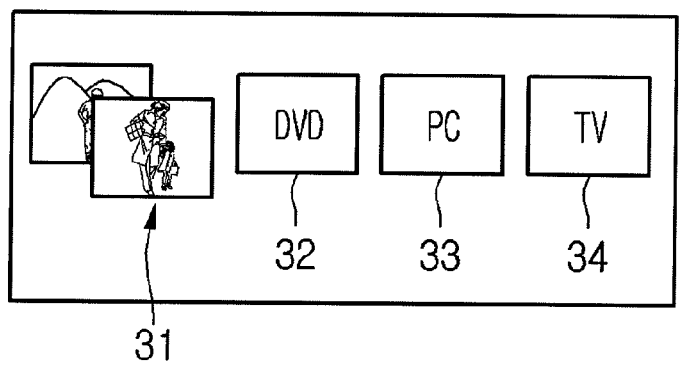

Referring to FIG. 12, the thumbnail images of multimedia data that have been replayed up to now may be overlapped and displayed as a plurality of sheets. The thumbnail image of multimedia data that has most recently been replayed is disposed in the foremost portion, and the thumbnail image of multimedia data that has been replayed before that is disposed behind the foremost portion. In this way, a 3D image may be composed. In another embodiment of the invention, the placement of the thumbnail image of multimedia data that has most recently been replayed may be disposed at the backmost portion, or may be selectively disposed by a user at a desired portion. Additionally, in various embodiments of the invention, a size of a thumbnail image of multimedia data that has most recently been replayed may be larger than a size of a thumbnail image of multimedia data that was most recently been replayed. The size of the thumbnail images of multimedia data may be enlarged or reduced according to user selection or by default. Additionally, a number of thumbnail images of multimedia data that are displayed may also be set by user selection or by default.

Figure 13:
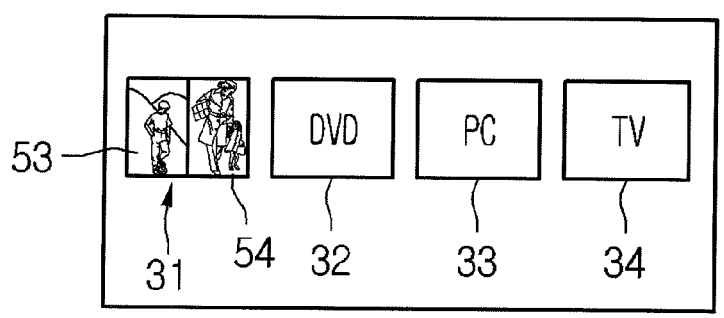

Referring to FIG. 13, the thumbnail images 53 and 54 of multimedia data that have been replayed up to now may be displayed as one icon 31. Moreover, in the icon 31 of FIG. 13, thumbnail images may be composed so that their occupied area may enlarge in recent replay order, according to embodiments of the invention. That is, the thumbnail image of multimedia data that has most recently been replayed may be displayed to have the largest area in the icon 31.

According to the embodiments of the invention of FIGS. 11 to 13, the multimedia data processing device 10 can provide information on the replay history of multimedia data included in a corresponding folder or a corresponding source device, to a user.

Figure 14:
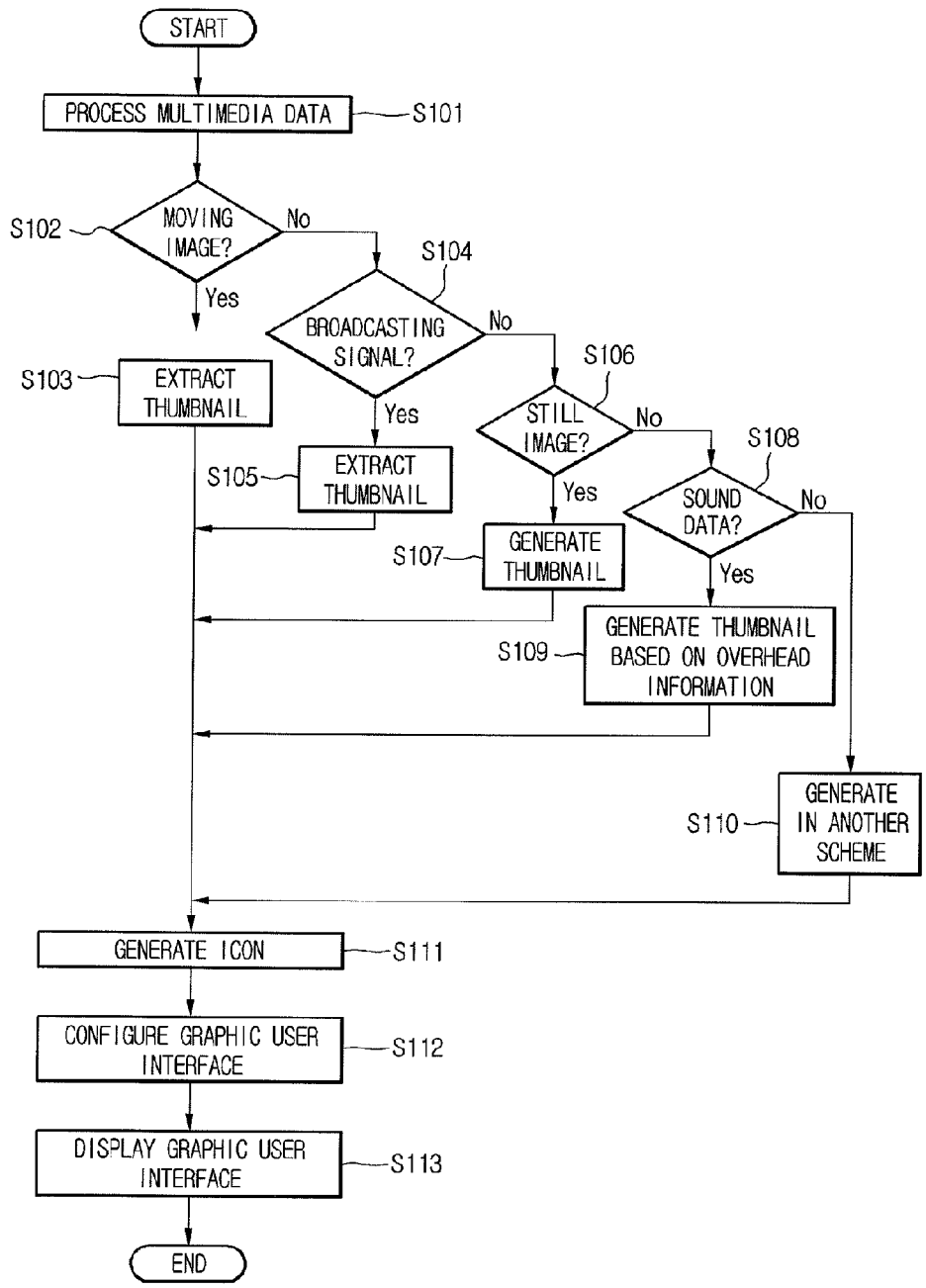
FIG. 14 is a flowchart illustrating a method for providing a graphic user interface based upon a usage history of multimedia data of a user, according to an embodiment of the invention.

FIG. 14 is a flowchart illustrating a method for providing a graphic user interface based upon the usage history of multimedia data of a user, according to one embodiment of the invention.

The multimedia data processing device according to an embodiment of the invention processes multimedia data in operation S101. When multimedia data is inputted from an external storage medium, the multimedia data processing device may process the multimedia data in an outputtable format. When multimedia data is received from an external input device having a replay function, the multimedia data processing device may transfer the multimedia data to the display and/or the speaker. Then, the multimedia data processing device generates an icon to be used for configuring a graphic user interface according to the kinds of multimedia data.

When the multimedia data is a moving image in operation S102, the multimedia data processing device extracts a thumbnail from the moving image in operation S103.

When the multimedia data is not a moving image in operation S102, and when the multimedia data is a broadcasting signal in operation S104, the multimedia data processing device extracts a thumbnail from the broadcasting signal in operation S105.

When the multimedia data is not a broadcasting signal in operation S104, and when the multimedia data is a still image such as a photograph in operation S106, the multimedia data processing device generates a thumbnail image through a scale-down operation in operation S107.

When the multimedia data is not a still image such as a photograph in operation S106, and when the multimedia data is sound data in operation S108, the multimedia data processing device generates a thumbnail image on the basis of overhead information, i.e., information such as a title and a singer in operation S109.

When the multimedia data does not correspond to any one of the above-described kinds of multimedia data, the multimedia data processing device generates a thumbnail image in another scheme or an arbitrary scheme suitable for the multimedia data in operation S110.

The multimedia data processing device generates an icon based upon the thumbnail image in operation S111.

The multimedia data processing device configures a graphic user interface with the generated icon in operation S112. Herein, the graphic user interface may be one for a file search. The multimedia data processing device displays the configured graphic user interface in operation S113. The above-described operations may be repeated each time the multimedia data is replayed.

The multimedia data processing device 10 according to one embodiment of the invention may be implemented as various devices. The following description will be made on examples of the multimedia data processing device that is implemented as a broadcasting receiving device, i.e., a set-top box or a TV.

Figure 15:
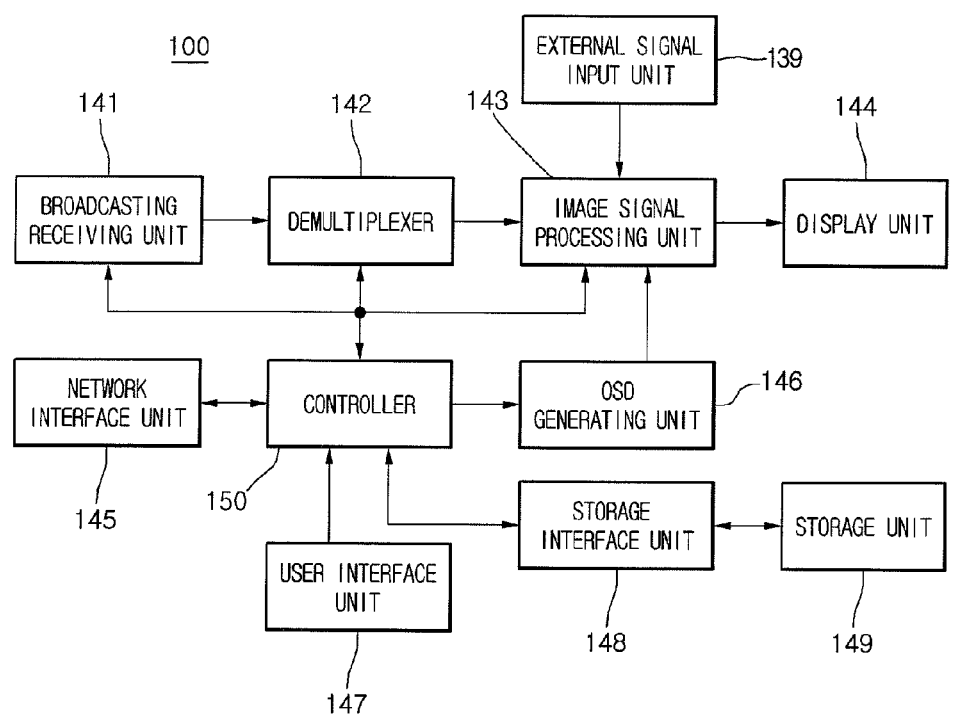
FIG. 15 illustrates a configuration of a broadcasting receiving device which may be used as a multimedia data processing device, according to one embodiment of the invention.

FIG. 15 illustrates a configuration of a broadcasting receiving device 100 which may be used as the multimedia data processing device 10, according to one embodiment of the invention.

FIG. 15 is a block diagram illustrating a configuration of a broadcasting receiving device 100 according to one embodiment of the invention.

A broadcasting receiving device 100 according to one embodiment of the invention has a function that receives content over a network, and moreover, it may have a function that receives a Radio Frequency (RF) broadcasting signal through a broadcasting receiving unit 141 in a wired or wireless way.

Referring to FIG. 15, the broadcasting receiving device 100 according to one embodiment of the invention includes a broadcasting receiving unit 141, a demultiplexer 142, an image signal processing unit 143, a display unit 144, a network interface unit 145, an On Screen Display (OSD) generating unit 146, a user interface unit 147, a storage interface unit 148, a storage unit 149, an external signal input unit 139, and a controller 150. All components of the broadcasting receiving device 100 are operatively coupled and configured.

Among the elements, the broadcasting receiving unit 141, the demultiplexer 142, and the image signal processing unit 143 may be configured as one broadcasting processing unit that receives a broadcasting signal and variously processes the received signal into a signal that may be outputted to the display unit 144.

When content is a digital broadcast, a digital broadcasting signal is transmitted in a transport stream type or format that has been packetized by time-division multiplexing a video signal, an audio signal and additional data.

The broadcasting receiving unit 141 may include an antenna that receives a broadcasting signal transmitted from the outside. Moreover, the broadcasting receiving unit 141 may include a tuner that tunes a broadcasting signal having a corresponding frequency band according to the tuning control signal of the controller 150 to be described below, and a demodulator (i.e, a demodulation unit) that performs a Vestigial Sideband (VSB) demodulation operation and an error correction operation on the broadcasting signal of the tuned specific channel to output a signal having a transport stream type or format.

A broadcasting signal received through the broadcasting receiving unit 141 is divided into all kinds of additional data, which are defined as a video signal, an audio signal and Program and System Information Protocol (PSIP) information, through the demultiplexer 142 and is outputted in a bit stream type or format.

Video data divided through the demultiplexer 142 is processed and displayed on the display unit 144 by the image signal processing unit 143.

The image signal processing unit 143 includes an MPEG-2 decoder, and a scaler that converts the video data to be suitable for a vertical frequency, a resolution and a screen rate in accordance with the output standard of the display unit 144.

Herein, the display unit 144 may be various kinds of display devices such as a Digital Light Processing Projector (DLP), a liquid crystal display (LCD) and a plasma display panel (PDP), among others.

An audio signal is processed by an audio signal processing unit (not shown) and is outputted to a speaker (not shown). Herein, the audio signal processing unit may include an AC-3 decoder.

Additional data, which is included in additional data divided through the demultiplexer 142, is stored in the storage unit 149 through the storage interface unit 148 to be described below.

The storage unit 149 may be implemented with an Electrically Erasable Programmable Read-Only Memory (EEPROM) or any other type of memory, including ones that are non-volatile.

As a way for receiving a request command from a user, the user interface unit 147 includes an infrared reception unit that receives infrared light inputted through a remote controller, or a local key input unit that is included in the one side of a panel.

The network interface unit 145 receives content or data over a network from a content provider 20 or a network operator. That is, the network interface unit 145 receives content and information associated with it, which are provided over the network from the content provider, such as broadcasting, a game, Video On Demand (VOD) and a broadcasting signal. Moreover, the network interface unit 145 also receives the updated information and updated file of a firmware that are provided by the network operator 10.

The OSD generating unit 146 generates an OSD type of menu screen for receiving the determination signal of a user. That is, the OSD generating unit 146 may display content received through the network interface unit 145 and information associated with it on the display unit 144.

The external signal input unit 139 is an interface that may receive an input from another replay device, for example, a DVD player and a game machine. The external signal input unit 139 may be connected to the other replay device and output multimedia, which is stored in the replay device, to the display unit 144.

The controller 150 controls an overall operation in accordance with a command that is inputted from the user interface unit 147. The controller 150 receives and executes the software of the content provider 20, which is received from the network operator 10, i.e., the updated file of a firmware.

The broadcasting receiving device of FIG. 15 may be one type in which a TV being one of source devices is combined with a multimedia data processing device. In the configuration of the broadcasting receiving device of FIG. 15, the functions of the controller 15 and the icon generating unit 16 of the multimedia data processing device of FIG. 2 may be performed by the controller 150. The broadcasting receiving unit 141 may operate as the multimedia data receiving unit 14 of FIG. 2. The demultiplexer 142 and the image signal processing unit 143 may operate as the multimedia data processing unit 15 of FIG. 2. Moreover, the storage unit 149 may operate as the storage unit 17.

When the source device is a USB memory, the function of the multimedia data receiving unit 14 of FIG. 2 may be performed by the storage interface unit 148.

When the source device is an external input device, the function of the multimedia data receiving unit 14 of FIG. 2 may be performed by the storage interface unit 148.

In the above-described embodiments of the invention, moreover, the configuration of a broadcasting receiving device to be described below may be used for outputting a 3D type of icon.

The broadcasting receiving device 100 according to one embodiment of the invention may output a 3D image. The menu screen of the broadcasting receiving device 100 may be provided as a 3D screen. Even when 3D content is provided by the content provider 20, the broadcasting receiving device 100 may receive and output the 3D content.

Figure 16:
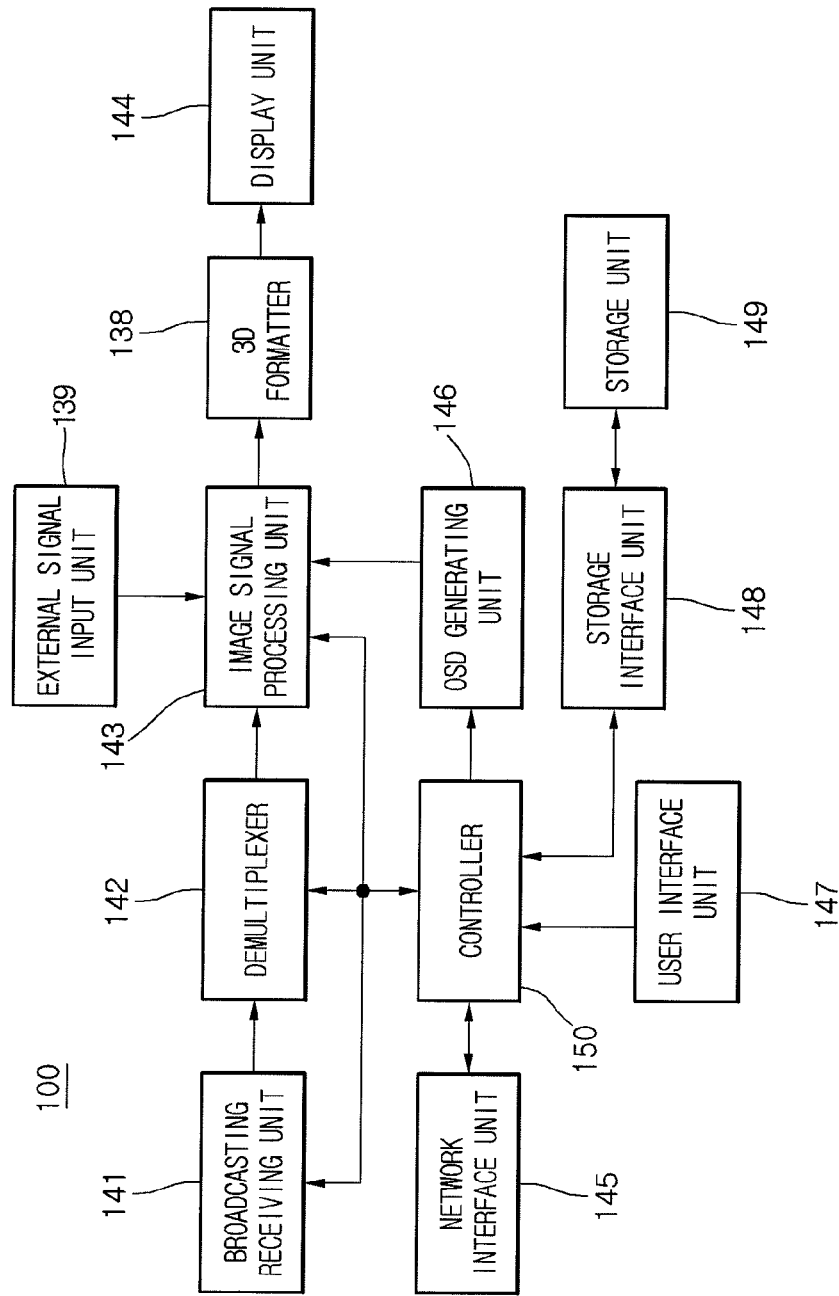
FIG. 16 illustrates a configuration of a broadcasting receiving device which may process a Three-Dimensional (3D) image, according to another embodiment of the invention.

An additional element is required for outputting a 3D image. FIG. 16 illustrates a configuration of a broadcasting receiving device 100 which may process a 3D image, according to another embodiment of the invention. In FIG. 16, the operations of elements other than the 3D formatter 138 are the same as those of FIG. 15. All components of the broadcasting receiving device 100 of FIG. 16 are operatively coupled and configured.

Referring to FIG. 16, the 3D formatter 138 is connected to the output port of the image signal processing unit 143. The 3D formatter 138 converts an image, which has been processed by the image signal processing unit 148, into a 3D image and transfers it to the display unit 144. The broadcasting receiving device may include a separate 3D formatter for converting an OSD output into a 3D image in the OSD generating unit 146.

The configuration of FIG. 16 is just one embodiment of the invention, and many technologies or techniques may be used for processing a 3D image.

According to embodiments of the invention, provided can be the graphic user interface for file search that varies dynamically.

According to embodiments of the invention, the usage history of a user can be included in the graphic user interface.

The configurations and methods of the above-mentioned embodiments of the invention are not applied, with limitation, to a device for displaying images and an operating method thereof according to one embodiment of the invention. The entirety or a part of embodiments of the invention can be selectively combined for configurations such that various modifications can be provided.

In addition, the operating method of a device for displaying images can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. (Also, functional programs, codes, and code segments for accomplishing the invention can be easily construed by programmers skilled in the art to which the invention pertains.)

Any reference in this specification to "one embodiment," "an embodiment," "example embodiment," etc., refers to a particular feature, structure, or characteristic described in connection with the embodiment of the invention is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments of the invention.

Although embodiments of the invention have been described with reference to a number of illustrative embodiments of the invention thereof, it should be understood that numerous other modifications and embodiments of the invention can be devised by those skilled in the art that will fall within the spirit and scope of the principles of this invention. More particularly, various variations and modifications are possible in the component parts and/or arrangements of the subject combination arrangement within the scope of the invention, the drawings and the appended claims. In addition to variations and modifications in the component parts and/or arrangements, alternative uses will also be apparent to those skilled in the art.

What is claimed is:

1. A multimedia data processing device for providing a graphic user interface, the multimedia data processing device comprising:

a display configured to display multimedia contents; and a controller configured to:

display a first graphic user interface including at least a first source icon representing a first source device and a second source icon representing a second source device, the first source device and the second source device including a plurality of multimedia contents, display a second graphic user interface including at least a first folder icon representing a first folder and a second folder icon representing a second folder, in response to a selection of the first source icon representing the first source device, the first folder and the second folder included on the first source device, display at least a first multimedia content included in the first folder, in response to a selection of the first folder icon representing the first folder included on the first source device, execute the first multimedia content, in response to a selection of the first multimedia content, display a thumbnail image corresponding to the first multimedia content in the first source icon representing the first source device, and in the first folder icon representing the first folder included on the first source device, change the thumbnail image in the first source icon and the first folder icon to include a new thumbnail image corresponding to a second multimedia content included on the first source device, in response to the second multimedia content being executed after the first multimedia content, and simultaneously display both thumbnail images corresponding to the first and second multimedia content on the first source icon.

2. The multimedia data processing device of claim 1, wherein the controller is further configured to separate the thumbnail images on the first source icon to match an order in which the first and second multimedia contents were executed.

3. The multimedia data processing device of claim 1, wherein the controller is further configured to display the thumbnail images in a form of a three dimensional image or in a form of multiple sheets.

4. The multimedia data processing device of claim 1, wherein the controller is further configured to set a display size of the first and second source icons according to a selection by a user.

5. The multimedia data processing device of claim 1, wherein the controller is further configured to set a number of thumbnail images displayed in a corresponding source icon according to a selection by a user.

6. The multimedia data processing device according to claim 1, further comprising:
    at least one of a TV broadcasting signal receiving unit, a Universal Serial Bus (USB) memory interface, a network interface, an external device input unit, an image signal processing unit and an audio signal processing unit.

7. The multimedia data processing device according to claim 1, wherein when the content comprises a moving image or a still image, the thumbnail image is from the moving image or the still image.

8. The multimedia data processing device according to claim 1, wherein when the content comprises sound data, the controller generates the thumbnail image based on header information of the sound data.

9. A method for a multimedia data processing device to provide a graphic user interface, the method comprising:
    displaying, via a display of the multimedia data processing device, a first graphic user interface including at least a first source icon representing a first source device and a second source icon representing a second source device, the first source device and the second source device including a plurality of multimedia contents;
    displaying, via the display, a second graphic user interface including at least a first folder icon representing a first folder and a second folder icon representing a second folder, in response to a selection of the first folder icon representing the first source device, the first folder and the second folder included on the first source device;
    displaying, via the display, at least a first multimedia content included in the first folder, in response to a selection of the first folder icon representing the first folder included on the first source device;
    executing, via a controller of the multimedia data processing device, the first multimedia content, in response to a selection of the first multimedia content;
    displaying, via the display, a thumbnail image corresponding to the first multimedia content in the first source icon representing the first source device, and in the first folder icon representing the first folder included on the first source device;
    changing, via the controller, the thumbnail image in the first source icon and the first folder icon to include a new thumbnail image corresponding to a second multimedia content included on the first source device, in response to the second multimedia content being executed after the first multimedia content; and
    simultaneously displaying both thumbnail images corresponding to the first and second multimedia content on the first source icon.

10. The method of claim 9, wherein when the content comprises a moving image or a still image, the thumbnail image is from the moving image or the still image.

* * * * *